Feb. 25, 1969  E. D. PERRY ET AL.  3,429,092
STRUCTURAL FRAMES AND METHODS AND MEANS THEREFOR
Filed May 26, 1966

INVENTORS
EDWARD D. PERRY
WAYNE C. HART
Cushman, Darby & Cushman
ATTORNEYS

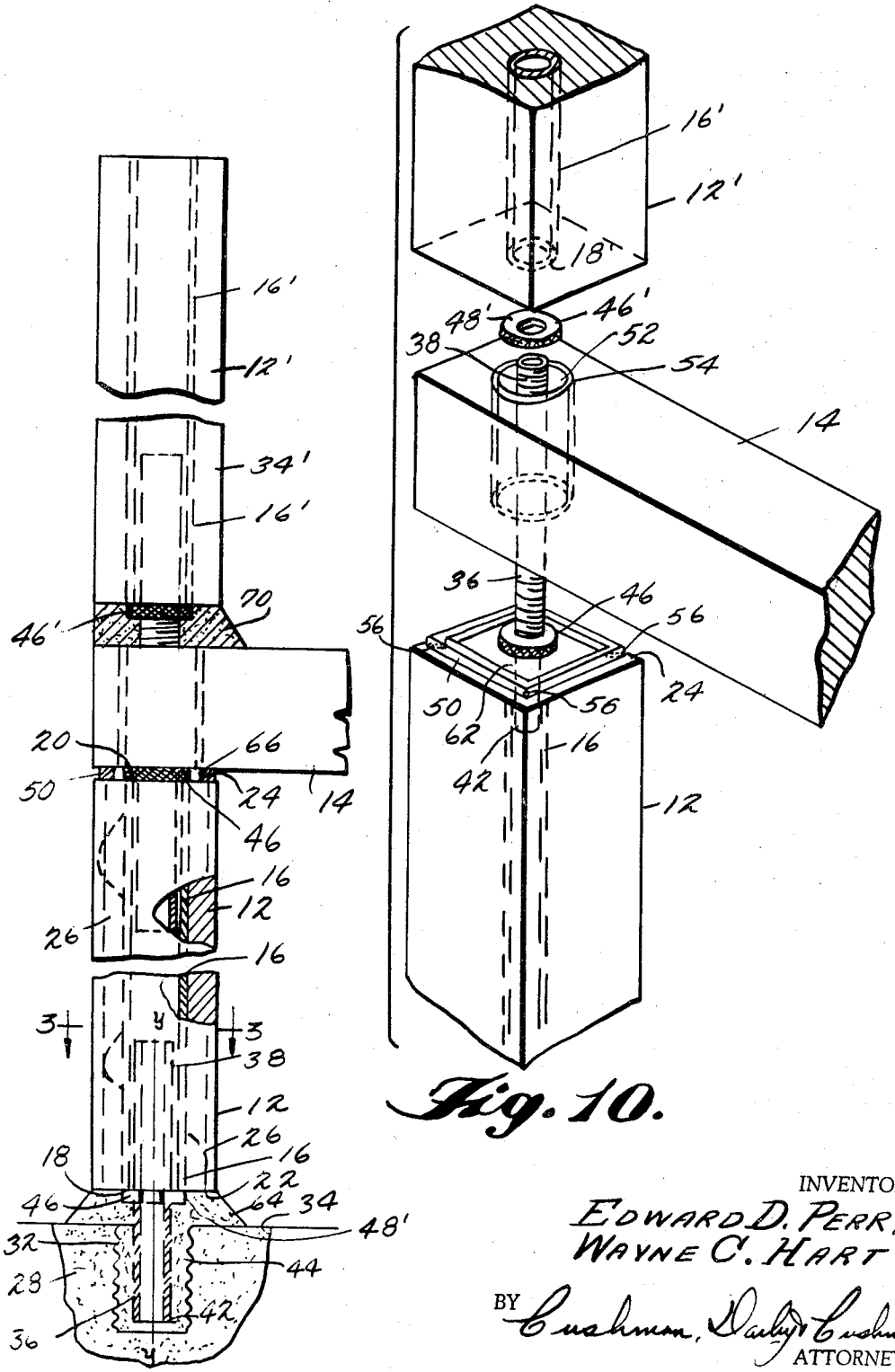

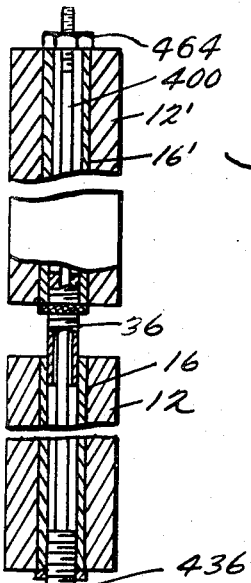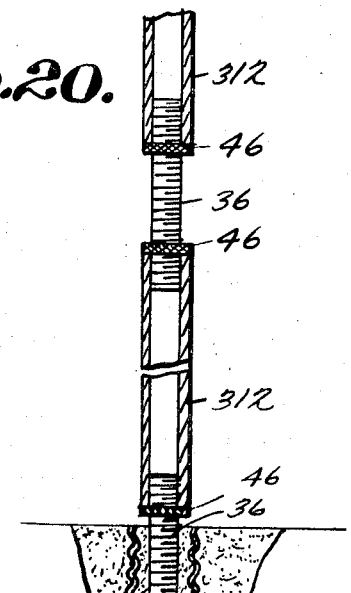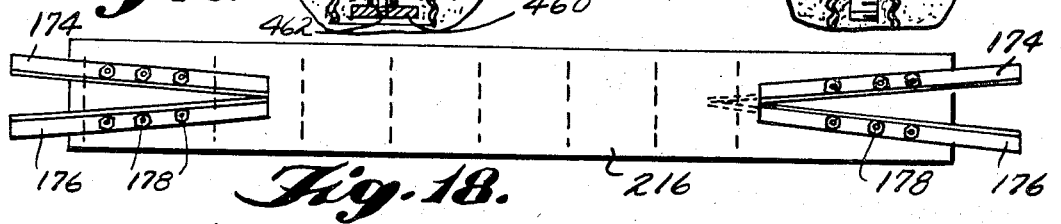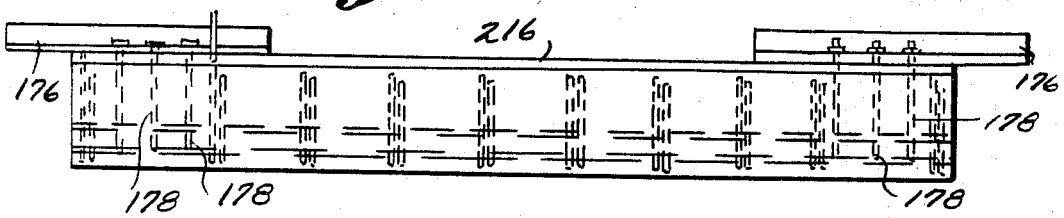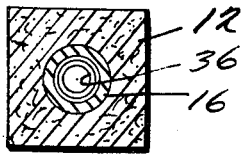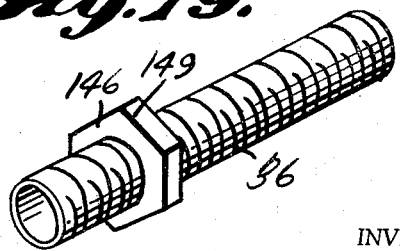

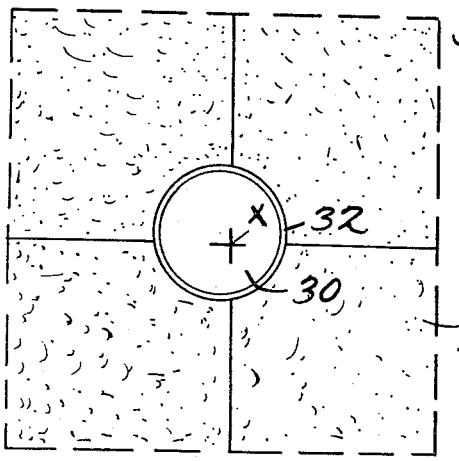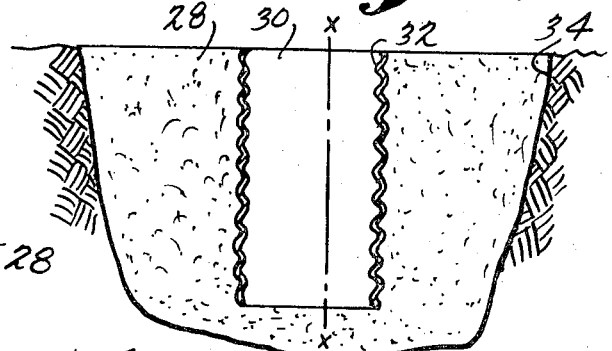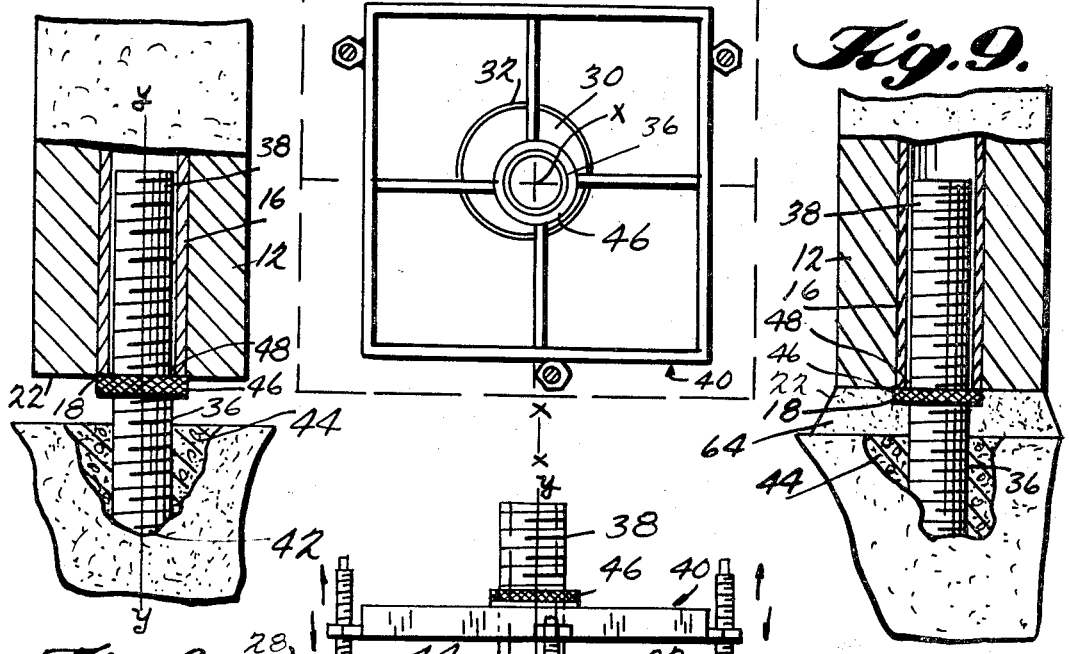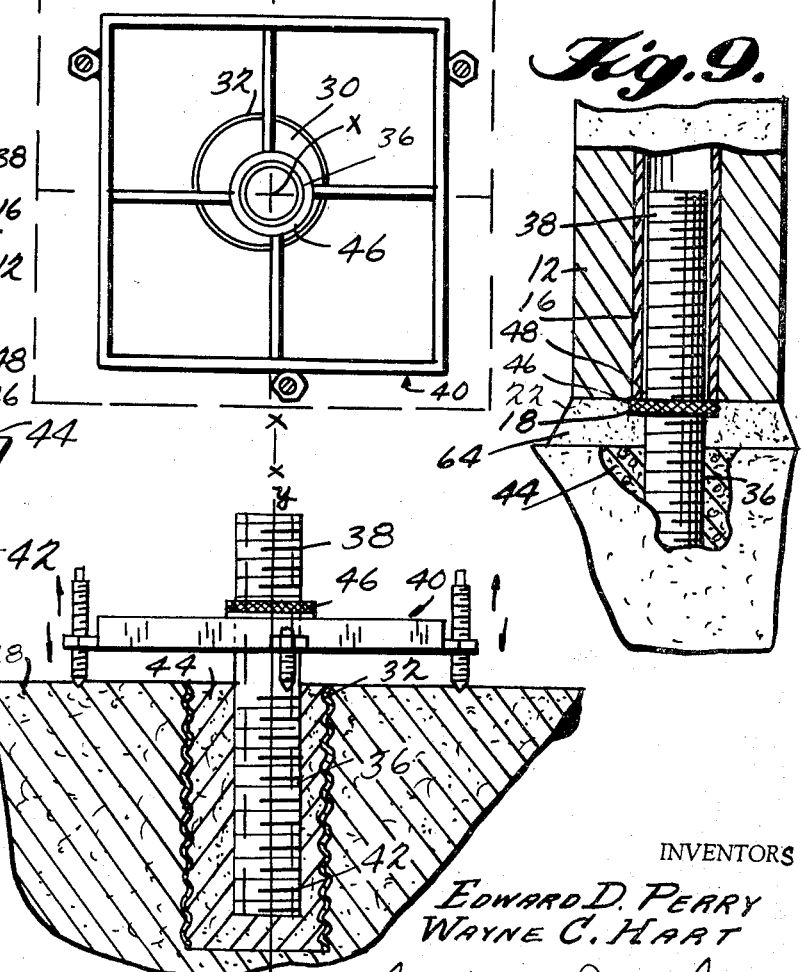

Feb. 25, 1969

E. D. PERRY ETAL 3,429,092

STRUCTURAL FRAMES AND METHODS AND MEANS THEREFOR

Filed May 26, 1966

INVENTORS
EDWARD D. PERRY
BY WAYNE C. HART

Cushman, Darby & Cushman
ATTORNEYS

INVENTORS
EDWARD D. PERRY
BY WAYNE C. HART
Cushman, Darby & Cushman
ATTORNEY

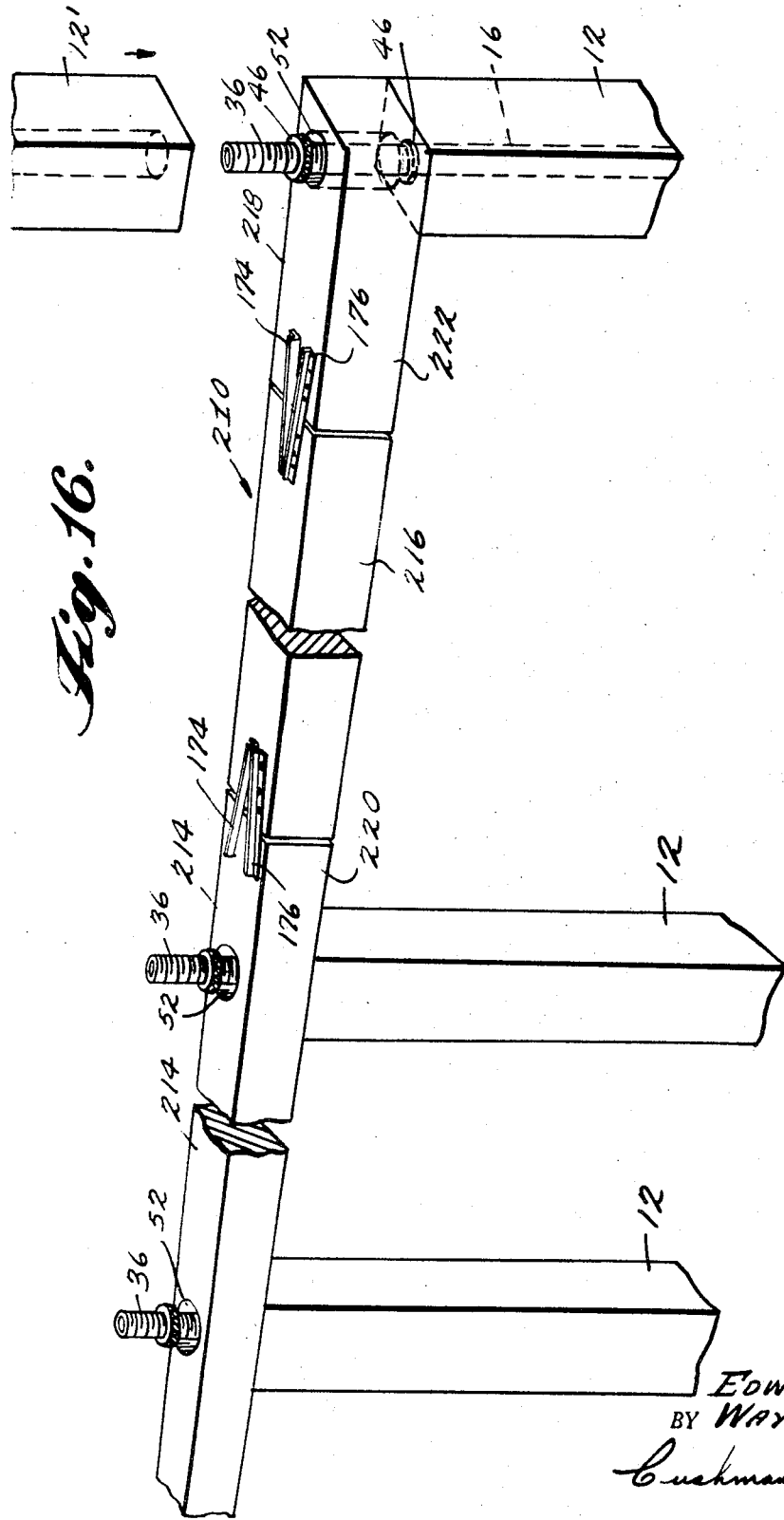

Feb. 25, 1969    E. D. PERRY ET AL    3,429,092
STRUCTURAL FRAMES AND METHODS AND MEANS THEREFOR
Filed May 26, 1966    Sheet 8 of 9

INVENTORS
EDWARD D. PERRY
BY WAYNE C. HART
Cushman, Darby & Cushman
ATTORNEYS

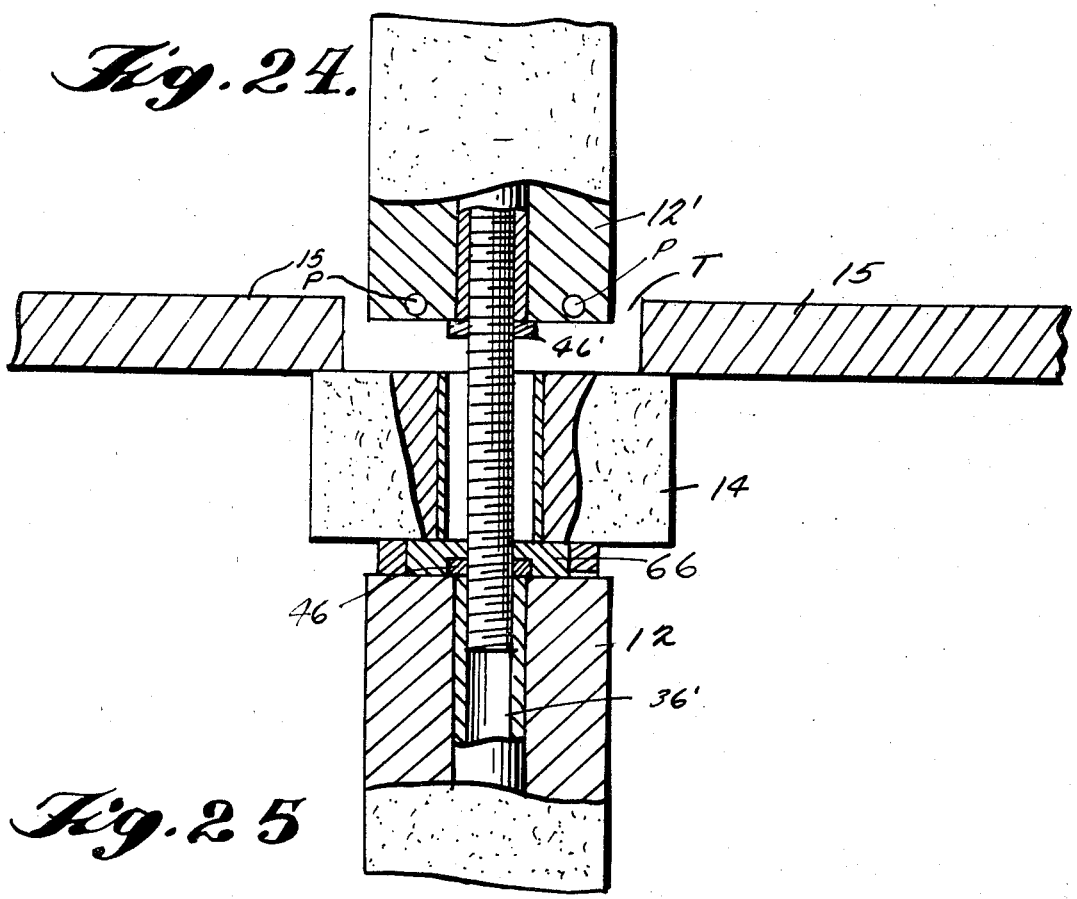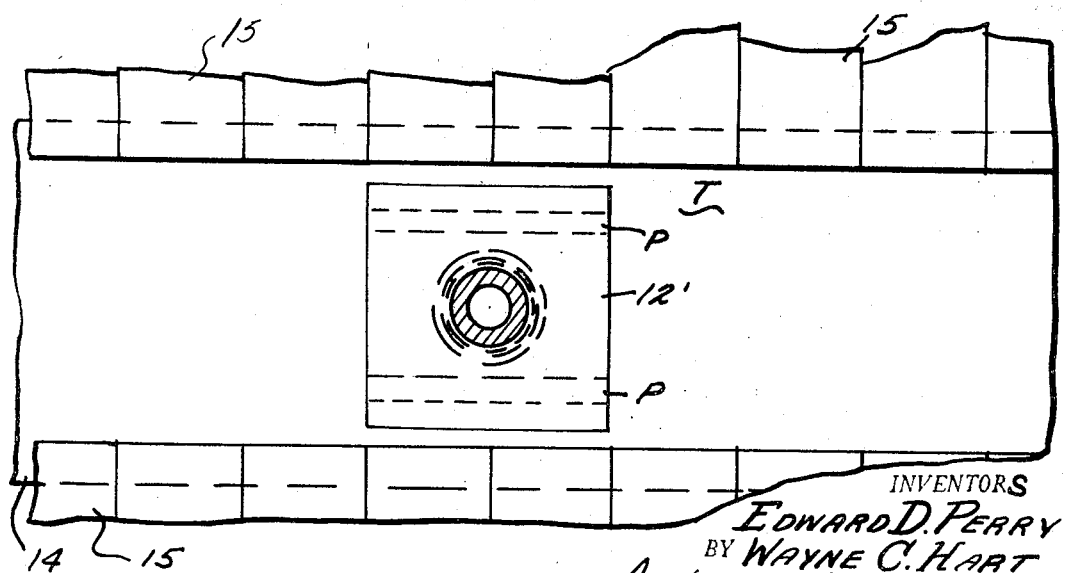

United States Patent Office 3,429,092
Patented Feb. 25, 1969

3,429,092
STRUCTURAL FRAMES AND METHODS
AND MEANS THEREFOR
Edward D. Perry, Adelphi, and Wayne C. Hart, Glen Arm, Md., assignors to Dyna Structures, Baltimore, Md., a joint venture
Filed May 26, 1966, Ser. No. 553,116
U.S. Cl. 52—648                                                  45 Claims
Int. Cl. E04b 1/22; E04h 1/00; E02d 27/42

ABSTRACT OF THE DISCLOSURE

A structural framing system utilizing preformed columns and beams and connections therefor which provide a rigid structural frame for both single and multistory structures. The columns which include axially extending bores are located, supported and connected to succeeding column tiers by connector spindles and radially extending collar means. The beams which comprise precast concrete include transversely extending bores which align with and receive the connector spindles extending from subjacent columns and can span a plurality of columns. A compressible gasket means can be interposed between the beam and the underlying column to define a bearing pad receiving space which is filled with a settable bearing pad forming material.

---

The present invention relates generally to the art of building construction and more particularly to improved structural frames and method and means for erecting and forming structural frames for buildings.

While the prior art column and beam constructions, and the methods employed to erect and form the same into structural frames for buildings have generally provided satisfactory structural integrity, such prior art structural framing suffers from various deficiencies and limitations. Thus, not only has the construction of such prior art structural elements as columns, beams and girders imposed undesirable limitations on the design of structural frames, but has also necessitated considerable time, and hence expense to erect and form the same into rigid, accurately formed structural frames. For example, heretofore in erecting a precast concrete structure utilizing precast concrete columns and beams the column base connections, which of course includes column to column connections, and the beam to column connections have required the utilization of a plurality of cumbersome mechanical elements, which are not only costly and cumbersome in the first instance, but are also time-consuming and hence costly to assemble and use in the erection of the structural frame. In addition, according to such prior practices, it is frequently impossible, or at least impractical and uneconomical to employ cantilever and multispan beam constructions and attain the often desirable functional advantages thereof. Furthermore, according to such prior art practices, particularly in precast concrete construction, if post tensioning of the structure was desired, it was necessary to specially cast post tension elements in the precast elements.

Typically, such prior art precast concrete column base connections, such as occur at the footing or foundation level as well as at the higher levels of the structure in effecting column to column splices, include the use of: steel base plates or steel angles secured to the bottom of the column, generally by welding to steel column reinforcement, or specially provided dowels embedded within the end of the column; threaded anchor bolts partially embedded so as to be anchored in a concrete footing or the underlying concrete member; leveling nuts threaded on each of the anchor bolts which engage the underside of base plate for leveling and adjusting the height of the column; and securing nuts threaded on each of the anchor bolts which engage the upper side of steel base plate. Among the several drawbacks commonly experienced with these prior art column base connections and column to column connections utilizing a base plate, or angle and a plurality of anchor bolts for each column are: the difficulty and considerable time involved in initially locating or positioning the plurality of anchor bolts accurately in the concrete footing at the building site, or in the case of column to column splices, in the end of one column; the maintenance of the anchor bolts in the desired position and condition until their ultimate use due to their considerable susceptibility to damage from accidental impact resulting from both manipulation of the precast concrete elements themselves as well as movement of heavy construction equipment as is commonly employed at a construction site; and the considerable time required to level and adjust the height of the column by means of the several leveling nuts.

Similarly, prior art beam to column connections wherein the beam is interrupted at each column and which typically include the use of the well known haunch type connections such as the reinforced concrete haunch, the horizontal plate haunch, the bolted angle haunch, the vertical plate haunch; welded bearing pads and hanging type connections, not only do not attain the structural advantages of a multispan beam construction but also consume considerable erection time and are hence expensive to erect.

Accordingly, it is a principal object of the present invention to provide an improved method and means for erecting and forming structural frames.

Another object of the present invention is to provide improved structural components for erecting and forming structural frames.

A further object of the present invention is to provide an improved method and means for erecting precast concrete structural frames.

A still further object of the present invention is to provide improved precast concrete structural components for structural frames.

An additional object of the present invention is to provide improved precast concrete column and beam constructions which are economical to produce and can be rapidly and economically erected to form a rigid structural frame.

A still additional object of the present invention is to provide improved precast concrete column and beam constructions which are economical to produce and a simple method for rapidly erecting the same at a building site to form a rigid precast concrete structural frame.

Another object of the present invention is to provide an improved means for connecting structural columns to an underlying support.

Still another object of the present invention is to provide an improved method of connecting a column to an underlying support.

A still further object of the present invention is to provide an improved column base connection for precast concrete columns.

Another object of the present invention is to provide an improved method of effecting a precast concrete column base connection.

An additional object of the present invention is to provide an improved connection between a precast concrete column and a precast concrete beam.

A further object of the present invention is to provide an improved method of connecting a precast concrete beam to a precast concrete column.

Another object of the present invention is to provide an improved precast concrete column and beam construction which can be rapidly and economically erected to form a rigid structural frame for both single and multi-story structures.

Another object of the present invention is to provide an improved precast concrete column construction and an improved means for easily and accurately adjusting the height and leveling the column during the erection thereof.

Another object of the present invention is to provide an improved means for connecting successive tiers of precast concrete columns and precast concrete beams to form a rigid structural frame.

Still another object of the present invention is to provide an improved method of erecting and forming a precast concrete structural frame.

A further object of the present invention is to provide an improved precast concrete structural frame construction.

A further object of the present invention is to provide an improved multiple tier precast concrete frame construction wherein multispan precast concrete beams can be feasibly and economically utilized at each tier level.

A still further object of the present invention is to provide an improved precast concrete column construction wherein the structural reinforcing means serves also as a means for connecting the column to other structural elements.

Other objects and the entire scope of the present invention will become apparent from the following detailed description and by reference to the accompanying drawings. It should be understood, however, that the detailed description and specific examples, while indicating preferred embodiments of the invention, are given by way of illustration only, since various changes and modifications within the spirit and scope of the invention will become apparent as the description herein progresses. Reference is now made to the accompanying drawings which form a part hereof, wherein:

FIGURE 2 is a fragmentary elevational view partly in section illustrating the connection details of a structural frame embodying the present invention;

FIGURE 3 is a sectional view taken along the line 3—3 of FIGURE 2;

FIGURE 4 is a sectional side elevational view of a column footing provided with a connector receiving cavity according to the present invention;

FIGURE 5 is a top plan view of the footing and connector receiving cavity shown in FIGURE 4;

FIGURE 6 is a sectional side elevational view illustrating the positioning and grouting of a connector spindle within a connector receiving cavity according to the present invention;

FIGURE 7 is a top plan view of the assembly shown in FIGURE 6;

FIGURE 8 is a side elevational view partly in section illustrating a column base connection according to the present invention prior to grouting of the column base;

FIGURE 9 is a side elevational view partly in section illustrating a column base connection according to the present invention subsequent to grouting of the column base;

FIGURE 10 is an exploded perspective view illustrating a column to column and column to beam connection assembly according to the present invention;

FIGURE 16 is a fragmentary perspective of a portion of a structural frame illustrating a modification of the present invention;

FIGURE 17 is a top plan view of a beam employed in the structural frame illustrated in FIGURE 16;

FIGURE 18 is a side elevational view of the beam illustrated in FIGURE 17;

FIGURE 19 is a perspective view illustrating another modification of the present invention;

FIGURE 20 is a side elevational view of still another modified form of the present invention;

FIGURE 21 is a side elevational view partly in section of a still further modification of the present invention;

FIGURE 24 is a fragmentary sectional view taken along the line 24—24 of FIGURE 22 with a column of the next upwardly adjacent tier added thereto; and FIGURE 25 is a top plan view, partly in section of the portion of the structural frame shown in FIGURE 24.

Figure 1:
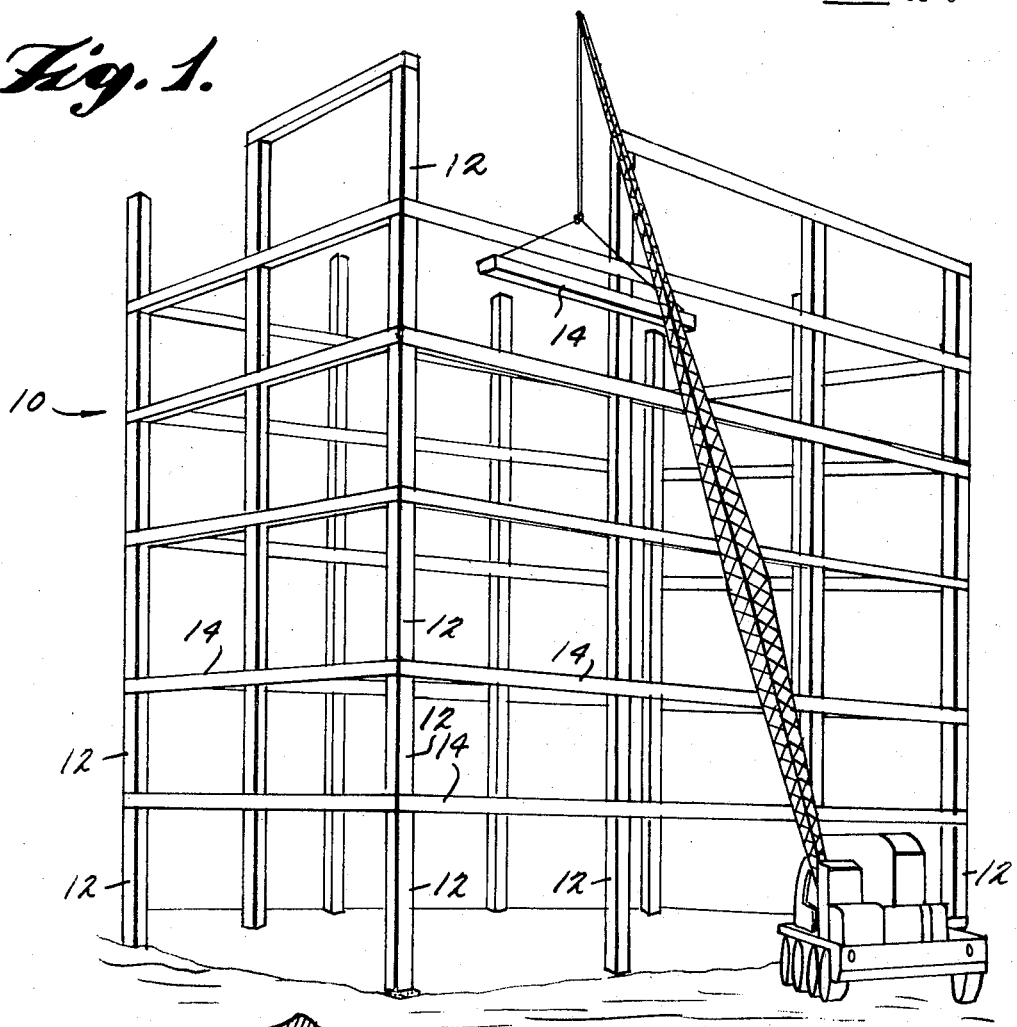
FIGURE 1 is a perspective view illustrating the present invention.

Referring now to FIGURES 1 and 2 of the drawings there is shown a structural frame 10 formed by a plurality of precast concrete columns 12 and precast concrete beams 14 according to the present invention. Each precast concrete column 12 is of generally rectangular horizontal cross-section and has imbedded therewithin a longitudinally extending hollow tubular core 16 having a circular transverse cross-section as best shown in FIGURE 3. The hollow core 16, which can conveniently comprise a steel pipe, is transversely centered within the column 12 and extends longitudinally throughout the length of the column so as to terminate in opposed core end faces 18 and 20 defining circular openings adjacent each of the substantially flat planar opposed end faces 22 and 24, respectively, of the column 12. As will be discussed more fully hereinafter, the core end faces 18 and 20 can be disposed inwardly of, flush with, or outwardly of, the opposed column end faces 22 and 24 with which they are respectively associated. The tubular steel core 16, as will be noted more fully hereinafter, serves as the principal steel reinforcing element in the precast concrete column 12. As will be well known to those skilled in the art, the concrete column 12 can also preferably contain steel in the form of rods and wires and spirals, indicated generally by dotted lines 26 in FIGURE 2, to control the performance characteristics of the precast concrete column 12 under load.

In erecting the column 12 according to the present invention a suitable concrete foundation or footing 28 having an upwardly opening connector receiving cavity 30 defined by a generally vertically extending hollow insert 32, is formed within a suitable excavation 34 provided at the desired predetermined location at the building site, as best shown in FIGURES 2 and 4. The hollow insert 32, which can conveniently comprise a length of corrugated metal conduit, is vertically disposed and embedded in the footing 28 such that the longitudinal centerline axis x—x, extended, of column 12 to be erected will be located within the area encompassed by the cavity 30 defined by interior surface of the hollow insert 32 and spaced radially inwardly therefrom a distance not less than one-half the inside diameter of the concrete column core 16 as seen in FIGURES 4 and 5. A column base connector spindle 36, which preferably comprises a length of exteriorly threaded steel pipe having an outside diameter slightly less than the inside diameter of the hollow column core 16, is vertically positioned within the connector receiving cavity 30 with its longitudinal central axis $y$—$y$ extending in coaxial alignment with the centerline $x$—$x$ of the column 12 to be erected and its upper end portion 38 extending freely above the upper surface of the footing 28 and the open uppermost end of the cavity 30, as shown in FIGURE 6. Conveniently, the connector spindle 36 can be located and temporarily retained in the desired vertical position by means of a suitable jig assembly or fixture generally indicated by the reference numeral 40 in FIGURES 6 and 7.

With the connector spindle 36 supported and retained in the desired vertical position with its longitudinal central axis $y$—$y$ in coaxial alignment with the centerline $x$—$x$ of the column to be erected, the cavity 30 surrounding the lower endmost portion 42 of the connector spindle 36, is filled with a suitable concrete grout 44, which is thereafter allowed to set. After the concrete grout 44 has set the jig 40 is removed from engagement with the upper end portion 38 of the connector spindle 36 which will then be anchored in a vertically extending position in the hardened grout 44.

Thereafter an elevation collar 46, which is internally threaded to mate with the exteriorly threaded connector spindle 36 is screwed or threaded onto the connector spindle. The external diameter of the elevation collar 46 must be greater than the inside diameter of the hollow column core 16 and is preferably substantially equal to the outside diameter of the core 16. The precast concrete column 12, which as aforementioned has embedded therein the longitudinally extending core 16, is then positioned so that the end 18 of the core 16 terminating adjacent the column end face 22, receives the upper free end portion 38 of the connector spindle 36. The column 12 is lowered onto the spindle 36 until the lowermost end face 18 of the core 16 engages the upper surface 48 of the elevation collar 46 as shown in FIGURE 8. As will be clear, any adjustment in the height or elevation of the column 12 which is necessary can be simply accomplished by rotating the collar 46 on the spindle 36, so as to move it upwardly or downwardly thereof the required distance. Since there is a very small, practically sliding clearance (exaggerated in the drawings for purposes of illustration) between the exterior surface of the connector spindle 36, and the interior surface of the column core 16, and since the connector spindle 36 has previously been precisely and truly located and vertically aligned at the time it was grouted in the footing 28, the column 12 when bearing freely on the elevation collar 46 will be substantially in plumb, that is, in substantially the desired vertical alignment as well as adjusted to the proper predetermined height.

As can be seen in FIGURES 2 and 8 of the drawings, the weight of the column 12, and of course any axially acting loads superimposed thereon, will be transmitted by the hollow core 16 to the connector spindle 36 through the elevation collar 46, which is threadingly interengaged therewith. In turn, the connector spindle 36 will transmit such load through the grout 44 and the insert 32 to the concrete footing 28. The external threads on the lower portion 42 of the connector spindle 36 embedded within and preferably bonded to the grout 44, interlock therewith to preclude slippage and thereby effectively assist in the transmission of axial loads from the connector spindle 36 to the grout 44. Similarly, the annular corrugations on the interior and exterior of the insert 32, which is preferably bonded to both the grout 44 and the concrete footing 28, result in a mechanical interlock between the grout 44, the insert 32 and the concrete footing 28 which effectively assists in transmission of the axial loads from the grout 44 to the concrete footing 28. In this regard, it should also be noted that the load carrying capacity of the connector spindle 36, the elevation collar 46 and the hollow column core 16 are most desirably of comparable magnitudes. Thus, the length of the elevation collar 46, i.e., the axial distance between opposed end faces, will be dictated by the load which the collar must be able to sustain and transfer from the hollow column core 16 to the connector spindle 36. Similarly, the wall thickness and material of both the hollow column core 16 and the connector spindle 36 will be dictated by the loads they must sustain and transmit as aforementioned. In addition, if as aforementioned, the external diameter of the elevation collar 46 is substantially equal to the outside diameter of the hollow column core 16 it will be seen that the upper surface 48 of the collar 46 will engage only the end face 18 of the core 16 and will not engage the concrete end face 22 of the column 12, regardless of whether the core end face 18 is disposed inwardly of, flush with, or outwardly of, the column end face 22 associated therewith. However, when according to the present invention an elevation collar 46 having an external diameter larger than the external or outside diameter hollow column core 16 is employed, the end face 18 of the core 16 should be flush with or extend slightly outwardly of the concrete end face 22 of the column 12 so as to insure positive interengagement of the end face 18 of the hollow core 16 and the upper surface 48 of the elevation collar 46. In order to avoid problems in the subsequent grouting of the column base (to be described hereinafter) which can arise as a result of the steel elevation collar extending over and/or contacting the concrete end face 22, it is preferred to employ a collar 46 having an external diameter substantially equal to the outside diameter of the end face 18 of the hollow column core 16.

Figure 12:
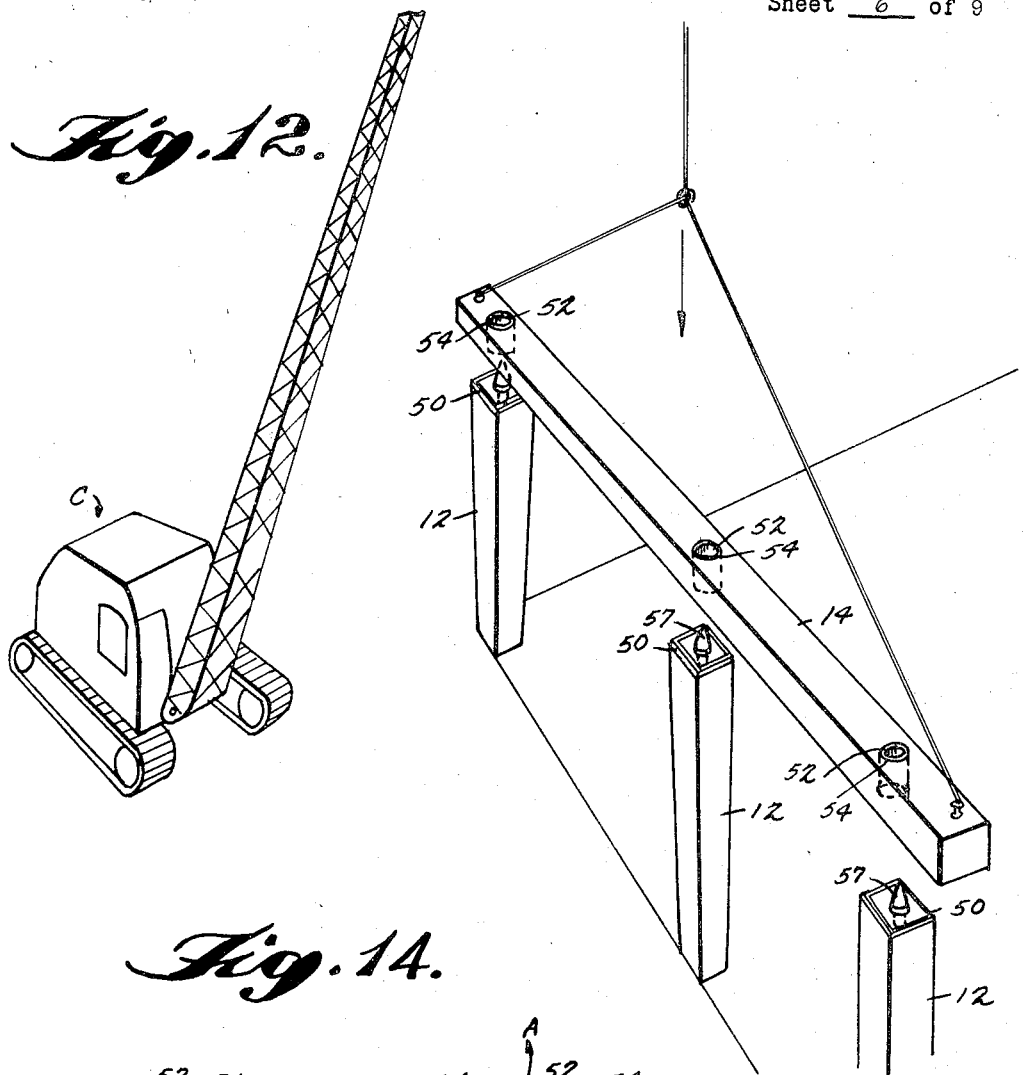
FIGURE 12 is a perspective view illustrating the placement of a multi-span beam upon previously erected columns to form a structural frame according to the present invention.

Referring now to FIGURE 12 of the drawings there is shown the setting of a continuous precast concrete beam 14 in position upon a plurality of columns 12 which have been erected as aforedescribed so as to be supported in desired predetermined positions by means of connector spindles 36 and collars 46, as shown in FIGURE 8, the columns 12 being provided with resilient ring-like seating gaskets 50 at their upper end faces 24. The precast concrete beam 14 is provided with a plurality of longitudinally spaced openings or bores 52 which extend transversely throughout the depth of the beam so as to open at the opposed upper and lower side faces thereof. Preferably, the transversely extending bores 52 in the beam 14 are defined or formed by hollow metal sleeves 54, such as sections of steel pipe, which are embedded within the beam 14 at the desired predetermined locations during the manufacture thereof. Inasmuch as beam 14 is reduced in effective cross section at the bores 52, the sleeves 54 are designed of a sufficient strength to compensate for such reduction in the concrete section. Consequently the discontinuity of the concrete in the beam 14 occurring at the bores 52 can be ignored for design purposes.

Figure 11:
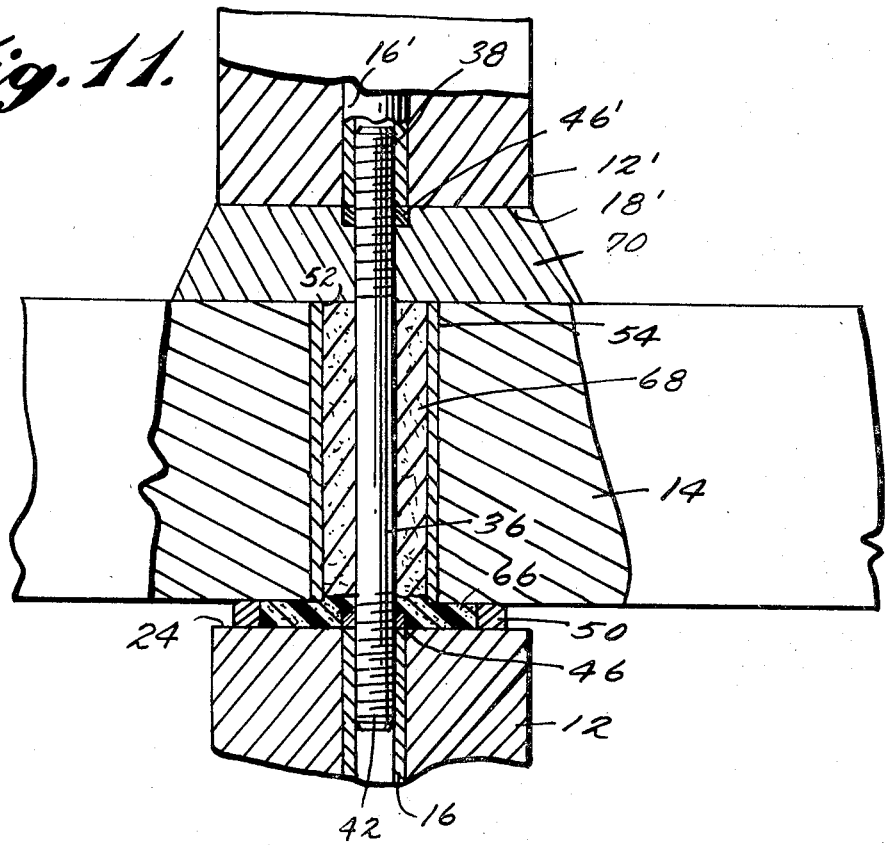
FIGURE 11 is a side elevational view, partly in section illustrating a column to column and column to beam connection according to the present invention.
Figure 14:
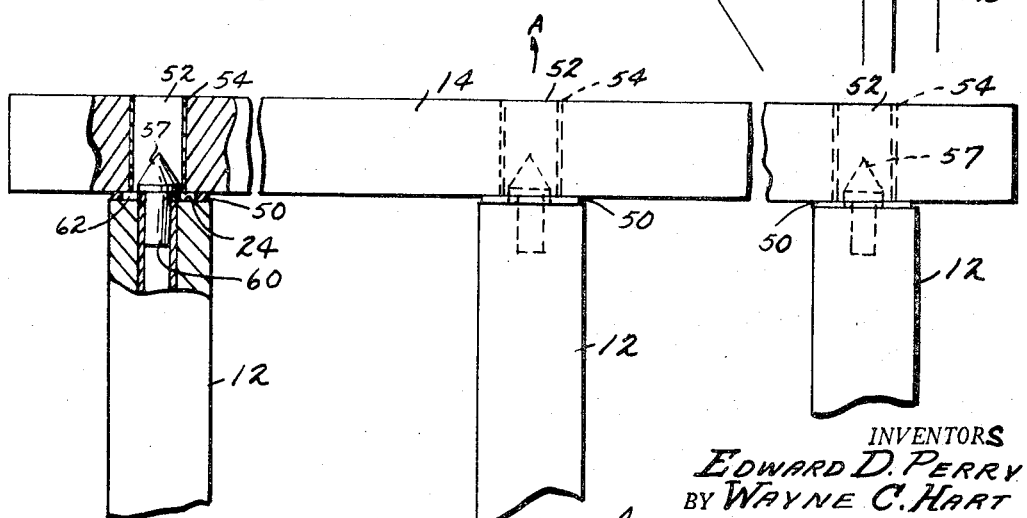
FIGURE 14 is a side elevational view illustrating a multispan beam operatively positioned so as to rest upon a plurality of columns according to the present invention.

As shown in FIGURE 14, the bores 52, which correspond in number to the number of columns 12 to be spanned by the beam 14, are located longitudinally of the beam so as to be in axial alignment with the respective underlying column cores 16 when the beam is set in place upon the columns 12. In addition, as clearly shown in FIGURES 10, 11 and 14 the diameter of each of the bores 52, i.e., the inside diameter of the steel sleeves 54 in the embodiment of the invention illustrated, is substantially greater than the maximum outside diameter of the elevation collars 46 employed herein but less than the transverse spacing between the opposed sides of the resilient gaskets 50. The gaskets 50 should be formed of a resilient material having high compressive strength such as neoprene rubber, and are preferably of a configuration and size such as to generally conform to, and be disposed adjacent, the outer periphery of the end face 24 of the column 12 with which it is associated. Of course, it will be appreciated by those skilled in the art that the gaskets 50 may have other polygonal configurations or may if desired by in the form of an annulus or ring. As most clearly shown in FIGURE 10 the sidewalls of the gasket 50 are pierced by small diameter tubular conduits 56 which permit fluid communication between the interior area enclosed by the gasket 50 and the exterior surrounding atmosphere for purposes which will become more fully apparent as the description herein progresses.

Figure 13:
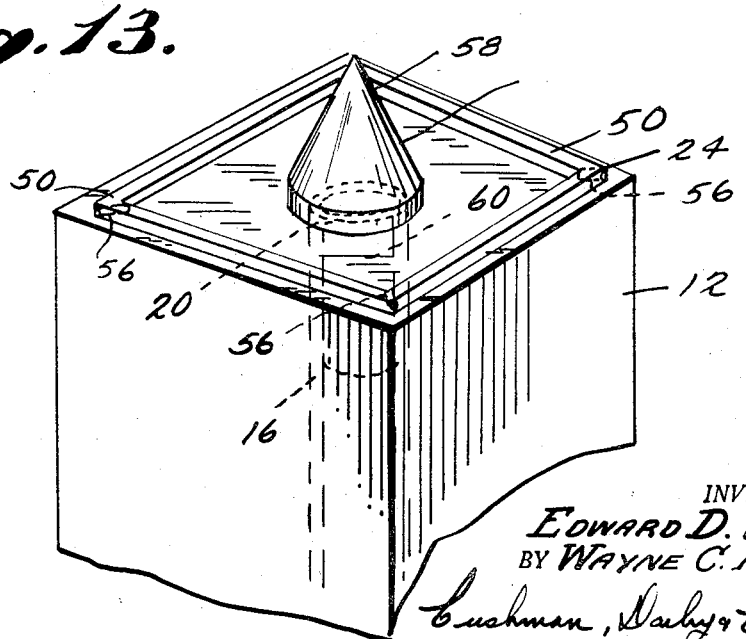
FIGURE 13 is a fragmentary perspective view of the upper end of one of the columns shown in FIGURE 12 with a pilot means operatively associated therewith.

As shown in FIGURE 12, the beam 14 is simply set upon the previously erected columns 12 by means of a suitable lifting device such as a crane C. In order to facilitate proper alignment of the beam bores 52 with the column cores 16 during the beam positioning operation, removable pilot means 57 can be removably disposed at the upper end faces 20 of the column cores 16. As best seen in FIGURE 13 the pilots 57 comprise an upper conical portion 58 having a maximum diameter at its base adjacent the core end face 20 and the column end face 24 which is slightly less than the inside diameter of bores 52 in the beam 14. In order to removably retain the pilot means 57 in position at the upper end face 24 of the column 12 the pilot means 57 is provided with a reduced cylindrical extension 60 which depends from the base of the conical portion 58 and is dimensioned so as to be slidably received within the upper end of the column core 16. In setting the beam 14 as shown in FIGURE 12 the pilots 57 will enter the respective beam bores 52 and function to automatically guide the beam 14 into the desired location atop the columns 12 during continued lowering of the beam 14. After the beam 14 has been set in position atop the columns 12, as shown in FIGURE 14, the pilot means 57 are removed from association with the columns 12 through the bores 52 in the beam 14 as indicated by the arrow A.

The beam 14 will be seen to be seated upon the resilient sealing gaskets 50, which by virtue of their compressibility will compensate for or accommodate any non-linearity or irregularity in the opposed bearing surfaces formed by the upper end face 24 of the column 12 and the lower side face of the beam 14 so that any inadvertent eccentric loading of the columns 12 will be eliminated. In addition, the gasket 50 will be seen to maintain the beam 14 out of direct contact with, and vertically spaced above the upper end face 24 of the columns 12 and define with the opposed bearing surfaces of the column 12 and beam 14 an enclosed pad receiving area 62. In addition, since the column base connection, FIGURE 8, has not been fixed as by grouting so that the columns can undergo slight lateral movement, placement of the beam 14 upon the columns 12 as shown in FIGURE 14 will result in an automatic plumb or alignment of the framing bay formed by the columns 12 and the beam 14.

With the beam 14 thus seated upon the seating gaskets 50 carried by the top end face of each of the columns 12, a second column lift of precast concrete columns 12' having hollow cores 16', of a construction identical to the columns 12 previously described, can be readily spliced to the upper end of the columns 12 by means of additional connector spindles 36 and elevation collars 46 also of a construction as previously described. Thus, as illustrated most clearly in FIGURES 2, 10 and 11 the lower end portion 42 of a connector spindle 36 having an elevation collar 46 threaded thereon is inserted through each of the open bores 52 in the beam 14 and into the upper end of the column core 16 until the lower end face of the collar 46 abuts the upper end face 20 of the column core 16.

The connector spindle 36 will be seen to be of a length such that when the elevation collar 46 on the lower end portion 42 of the connector spindle 36 engages the upper end face 20 of the column core 16, the externally threaded upper end portion 38 of the connector spindle 36 extends freely above the upper side face of the beam 14 and has threaded thereon a second elevation collar 46'.

The precast column 12' is then positioned so that the end 18' of the core 16' embedded therewithin, slidingly receives the upper free end portion 38 of the connector spindle above the second collar 46'. As was the case in erecting the column 12 described earlier, the column 12' is lowered onto the spindle 36 until the end face 18' of the column core 16' engages the upper surface 48' of the elevation collar 46'. Of course, as heretofore described any desired adjustment in the elevation of the column 12' can be effected by simply rotating the collar 46' on the spindle 36 so as to thread the same longitudinally thereof in the desired direction.

After spindle 36 has been operatively positioned in the upper end of the core 16 of the column 12 and either before or after the splice between the column 12 and the column 12' is effected as aforementioned the base of the column 12 is grouted by filling the space between the lower end face 22 of the column 12 and the underlying uppermost surface of the concrete footing 28 with a suitable concrete grout 64 as shown most clearly in FIGURES 2 and 9. In this regard it will be seen that since the collar 46 and the exterior diameter of the column core 16 are the same, the grout 64 can be readily packed around the collar 12 so as to completely fill the space between the footing and the column and thus be in intimate contact with all theretofore unsupported portions of the lower end face 22 of the column 12. When elevation collars having an outside diameter greater than the outside diameter of the column core 16 are employed difficulty may be encountered in insuring that the grout 64 fills any small spaces or cavities which may occur between the lower column end face 22 and the collar 46. After the base of the column 12 has been grouted, a suitable bearing pad forming material 66 is poured or otherwise discharged through each of the bores 52 in the beams 14 so as to fill the space 62 between the upper face 24 of the columns 12 and the opposed side face of the beam which is enclosed by the resilient gasket 50.

A suitable pad forming material should have a relatively low viscosity in its fluid state and be capable of developing upon setting for a short term a substantially high strength solid body without shrinkage during such setting or curing. In this regard a suitable bearing pad material has been found to comprise a mixture of epoxy resin and sand which attains 60% of its ultimate strength within 24 hours without shrinkage. During pouring of the liquid pad forming material 66, the small tubular conduits 56 in the gasket 50 will permit any entrapped air to escape from the space 62 so as to insure that the same is completely filled by the bearing pad material. After the bearing pad material 66 has set, each of the bores 52 of the beam 14 are filled with a suitable grout 68 which is permitted to set. Thereafter, the base of the second column 12' is grouted by filling the space between the upper side face of the beam 14 and lower end face 18' of the column 12' with a suitable grout 70.

Figure 15:
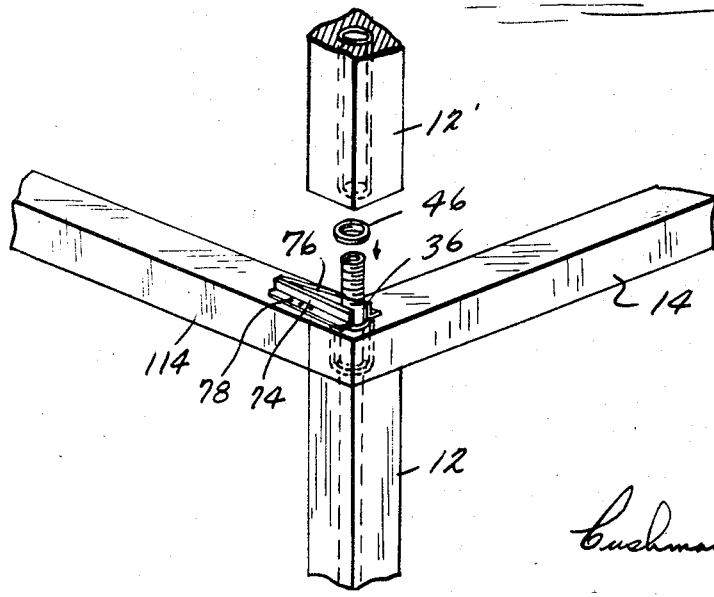
FIGURE 15 is a fragmentary perspective view illustrating a corner connection in a structural frame embodying the present invention.

Referring now to FIGURE 15 of the drawing there is illustrated the simple manner in which abutting beams 14 and 114 can be connected at the top of a column 12 according to the present invention. The beam 114 will be seen to be provided at its end with a pair of laterally spaced steel angles 74 and 76 which extend longitudinally of the beam 114 and beyond the end thereof so as to engage the upper side face of the beam 14 adjacent diametrically opposed positions of the spindle 36. The angles 74 and 76 which thus straddle the connector spindle 36 are rigidly and firmly connected to the precast concrete beam 114 by means of suitable studs or bolts 78 which are partially embedded and anchored in the beam 114. The next column lift formed by columns 12' can be erected on the spindle 36 and collar 46 and thereafter grouted in manner aforedescribed.

Referring now to FIGURE 16 of the drawings there is shown a modified form of framing bay 210 embodying the present invention. The construction of the framing bay 210 differs from that just described by particular reference to FIGURES 12 and 14, in that a single continuous beam is not employed to span the three previously erected columns 12 but rather a plurality of precast concrete beams 214, 216 and 218. The beams 214 and 218 are of a construction substantially similar to the precast concrete beam 14 previously described and will be seen to include transversely extending bores 52 which are operatively aligned with the cores 16 of the supporting columns 12. The beams 214 and 218 differ from the beam 14 previously described in that they each have portions 220 and 222 respectively, which extend beyond the end face of the columns 12 in a cantilever fashion. The span between the opposed cantilevered end portions 220 and 222 of the beams 214 and 220 is closed by a hanging beam 216, which is provided at each opposed end with a pair of laterally spaced steel angles 174 and 176 which engage the upper side faces of the cantilevered end portions 220 and 222 of the beams 214 and 218, respectively.

As best seen in FIGURES 17 and 18 each pair of steel angles 174 and 176 is secured to the beam 216 by means of bolts 178 which are partially embedded and anchored within the beam 216.

Referring now to FIGURE 19 of the drawings, there is shown a modified elevation collar 146 threadingly engaged on a connecter spindle 36 according to the present invention. The elevation collar 146 differs from the elevation collar 46 previously described in that it is provided with a non-circular exterior surface 149 which is readily engageable by a wrench or other suitable lever means to facilitate the rotation of the collar 146 for elevational adjustment of columns supported thereby.

Referring now to FIGURE 20 of the drawings, there is shown another modified form of columns 312 embodying the present invention. The columns 312 differ from the precast concrete columns 12 heretofore described in that the columns 312 simply comprise lengths of steel pipe. As will be clear to those skilled in the art, the tubular steel columns 312 can be erected to form a structural frame in the manner heretofore described by reference to the precast concrete columns 12.

Referring now to FIGURE 21 of the drawings there is shown a still further modified form of the present invention wherein the erected columns 12 and 12' are subjected to post tensioning by means of a tension rod 400. The column base connector spindle 436 will be seen to carry at its lowermost end a plate 460, having an interiorly threaded bore 462 in axial alignment with the bore of the connector spindle 436. The steel post-tensioning rod or bar 400 extends through the common bore defined by the interior of: the core 16' in the column 12'; the connector spindle 36; the core 16 of the column 12; and the connector spindle 436 and is threadingly inter-engaged at one end with the threaded bore 462 in the plate 460. After tensioning of the bar 400, the other end of the bar is gripped by a suitable gripping means 464 which engages the upper end of the column core 16' so as to impose the desired compressive stress on the entire column assembly.

Figure 22:
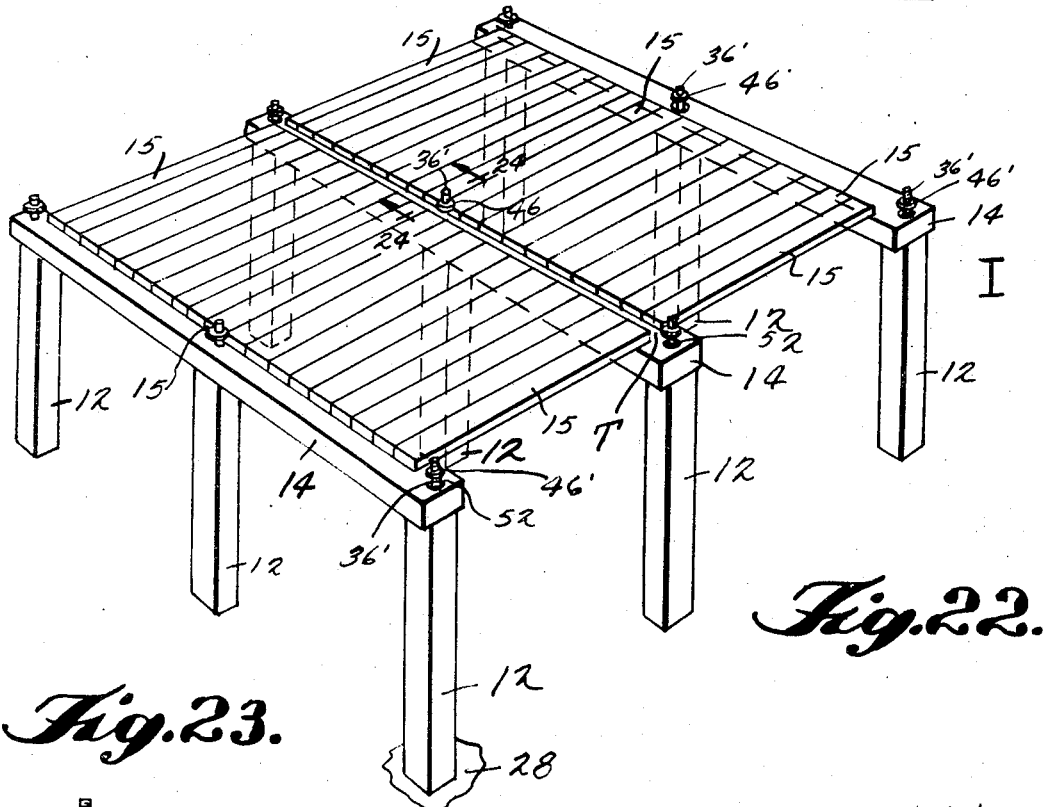
FIGURE 22 is a perspective view illustrating the first tier of a structural frame embodying the present invention.
Figure 23:
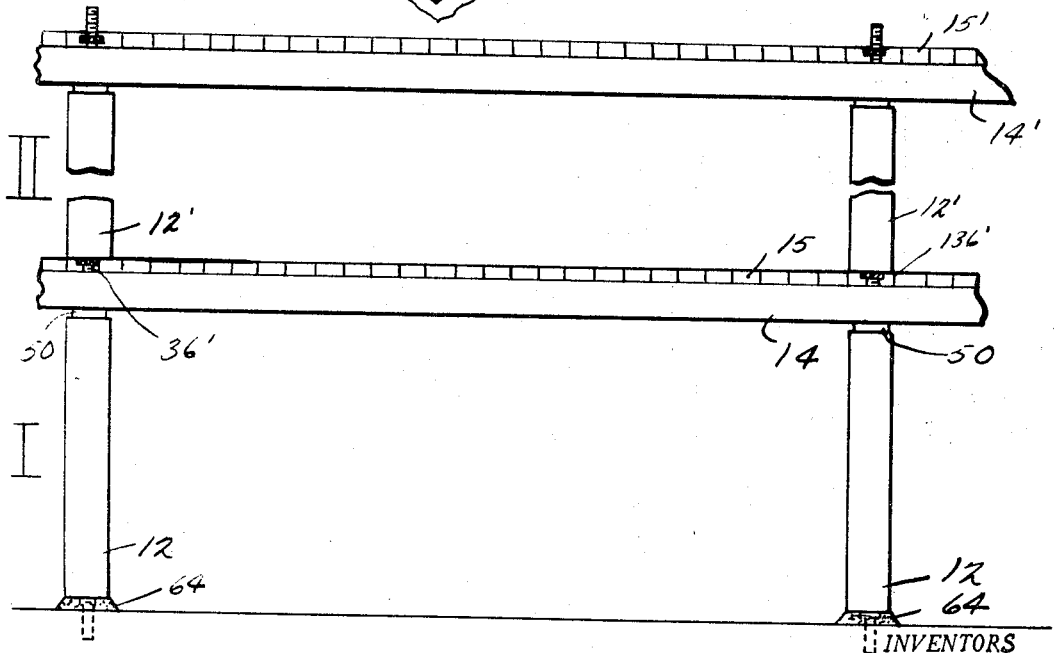
FIGURE 23 is a fragmentary elevational view illustrating two tiers of a multiple story structural frame embodying the present invention.

The above-described method and means for erecting and forming structural frames is particularly advantageous in constructing multistory buildings in that it permits a tier or floor of the structure to be substantially completed prior to the erection of the next succeeding tier. That is, it permits the erection of a first column tier with its associated beams and flooring structure to be completed prior to the erection of the second and subsequent structural tiers. This tier by tier completion feature of the present invention permits considerable economies in the overall cost of erection in that it allows ancillary construction and installation of peripheral equipment such as electrical wiring, heat and plumbing and other interior finishing operations to commence in the completed tier at an earlier stage in the construction than heretofore practicable, and continue simultaneously with the erection of the subsequent tiers or stories of the structural frame. Thus, referring now to FIGURES 22 and 23 of the drawings the first erected structural tier generally indicated by I comprises precast concrete columns 12, precast concrete beams 14 and prestressed precast concrete planks 15 spanning adjacent framing bays and supported by the beams 14. The columns 12 and beams 14 are erected in the manner aforedescribed by reference to FIGURES 1, 2, 4–8, 12 and 14. After the plank 15 is set in place in a conventional manner on the beams 14, and the connector spindles 36', and their associated elevation collars 46', which are to be used in effecting the splice between the erected columns 12 and the columns 12' of the next upwardly adjacent tier II (see FIGURE 23), are positioned or set in the top of the columns 12, the base of each column 12 is grouted as described earlier and best shown in FIGURE 9, the bearing pad between the beams 14 and top of the columns 12 is formed by filling the pad receiving space with the bearing pad material 66 and the bores 52 of the beams 14 are filled with grout 70 all as described heretofore and shown best in FIGURE 11. Thereafter, further construction work can commence within the thus constructed first tier I while the next tier II comprising columns 12', beams 14' and plank 15' is erected by merely repeating the steps employed in erecting tier I. As best shown in FIGURES 22, 24 and 25 the opposed ends of the prestressed concrete planks 15 define, together with the upper face of the beam 14 upon which they are supported, a substantially continuous trough T in which electrical conduit, piping and the like may be conveniently located, and thereafter covered with suitable concrete grouting material. In addition, if desired the columns 12' can be provided with laterally spaced reinforcing bar receiving passages P adjacent the lower end faces 18' thereof which extend transversely through the columns generally parallel to the longitudinal axis of the trough T. Thus reinforcing bars which are to be grouted in the trough T can, if desired, extend through the passages P in the columns 12'.

From the foregoing description of the various embodiments of this invention, it is evident that the objects of this invention, together with many practical advantages are successfully achieved. While preferred embodiments of our invention have been described, numerous further modifications may be made without departing from the scope of this invention.

Therefore, it is to be understood that all matters herein set forth or shown in the accompanying drawings are to be interpreted in an illustrative and not in a limiting sense.

What is claimed is:

1. A method for erecting at a building site a structural frame utilizing a column having an axially extending bore opening at least at one end of said column comprising the steps of:

erecting at a predetermined location at said building site an elongated connector means, having at least one end portion adapted to be slidably received axially within said bore of said column and a radially outwardly extending enlargement having a transverse extent greater than that of said bore intermediate said one end portion and the other end portion of said connector means, so that said one end portion extends freely above said other end portion;

inserting said freely extending one end portion of said connector means into said bore so that the end face of said bore adjacent said one end of said column engages said enlargement whereby said column will be operatively positioned and supported at said predetermined location;

disposing a beam over the other end of said column so that said beam is supported thereby;

and thereafter introducing a grout material into the space adjacent said one end of the column and the connector means and allowing said grout material to set.

2. The method defined in claim 1 wherein the enlargement is movable longitudinally of the elongated connector means and which includes the step of moving said enlargement longitudinally of said connector means so as to adjust the elevation of said column.

3. A method for erecting at a building site a structural frame utilizing a column having a bore opening at least at the lower end of said column comprising the steps of:

erecting an elongated connector means having an exteriorly threaded cylindrical portion at one end adapted to be slidably received within the bore of said column, by rigidly embedding the other end portion thereof in a suitable footing means at a predetermined location at said building site so that said exteriorly threaded cylindrical end portion extends freely above said footing means in a predetermined position;

threadingly interengaging an interiorly threaded collar means with said exteriorly threaded free end portion of said connector means so as to effect threaded interengagement of said collar means with said connector means intermediate said footing means and the terminus of the free end portion of said connector means;

disposing said column over said free end portion of said connector means so that the free end portion thereof which extends above said collar means is slidably received within said bore at the lower end of said column and at least a portion of the lower end of said column engages said collar means so that said column is adjustably supported thereby in said predetermined location and substantially in said predetermined position;

disposing a beam over the upper end of said column so that said beam is supported thereby;

and introducing a settable grout material into the space intermediate the footing means and the lower end of said column and allowing said grout material to set.

4. The method set forth in claim 3 which includes the step of rotating the collar means relative to the connector means so as to move said collar longitudinally of said connector means to thereby adjust the elevation of the column relative to said connector means.

5. A method for erecting at a building site a plurality of superposed structural columns having axially extending cylindrical bores opening at each opposed end thereof comprising the steps of:

erecting a first elongated connector means having at least one cylindrical portion terminating at one end thereof which is exteriorly threaded and adapted to be slidably received with the bore of the first of said columns, by rigidly embedding the other end of said first connector means in a footing at a predetermined location at said building site so that said one end thereof extends freely above said footing in a predetermined position;

threadingly interengaging an interiorly threaded collar means with said exteriorly threaded portion of said first connector means so as to effect threaded interengagement of said collar means with said first connector means intermediate said footing and the terminus of said freely extending one end of said first connector means;

disposing said first column over said freely extending one end of said first connector means so that said terminal free end portion thereof which extends above said collar means is slidably received within the axial bore at one end of said first column and said one end of said first column abuts said collar means whereby said first column is adjustably supported at said predetermined location and substantially in said predetermined position;

inserting one terminal end of a second elongated connector means having a pair of collar means interengaged therewith intermediate the opposed terminal ends thereof, in the axial bore of said first column at the other end thereof so that one of the collar means of said pair abuts said other end of said first column and the other collar means of said pair and the other terminal end of said second connector means are disposed freely above said other end of said first column; and disposing a second column over said other end of said second connector means so that said other end of said second connector means is slidably received within the axial bore at one end of said second column and said one end of said second column abuts said other collar means of said pair whereby said second column is supported at said predetermined location in a predetermined position relative to said first column.

6. The method defined in claim 5 wherein the second connector means is exteriorly threaded for at least a portion of its length intermediate its opposed terminal ends and at least one collar means of the pair is threadingly interengaged therewith so as to be movable longitudinally of said second connector means and which includes the step of threading at least said one collar means of said pair along said second connector means to adjust the vertical spacing between said first and second columns.

7. The method defined in claim 5 which includes the steps of introducing a grout material adjacent the first connector means and into the space intermediate the footing and the adjacent one end of the first column and allowing said grout material to set.

8. A method for erecting at a building site a precast concrete column having an axially extending tubular core defining a cylindrical bore opening adjacent the opposed end faces of said column comprising the steps of:

erecting an elongated connector means having an exteriorly threaded cylindrical portion at at least one end which is adapted to be slidably received within the cylindrical bore of said column, by rigidly embedding the other end portion thereof in a suitable footing means at a predetermined location at said building site so that said exteriorly threaded cylindrical portion extends freely above said footing means in a predetermined position;

threadingly interengaging an interiorly threaded collar means with said exteriorly threaded cylindrical free end portion of said connector means so as to effect threaded interengagement of said collar means with said connector means intermediate said footing means and the terminus of the free end portion of said connector means;

disposing said precast concrete column over said free end portion of said connector means so that the free end portion thereof which extends freely beyond said collar means is slidably received within said cylindrical bore adjacent one end face of said column and the adjacent end face of said core engages said collar means so as to support said column in said predetermined location and substantially in said predetermined position.

9. The method defined in claim 8 which includes the steps of: rotating the collar means relative to the connector means so as to move said collar longitudinally of said connector means and thereby adjust the elevation of the precast column; introducing a settable cement-like grout material into the space intermediate the footing means and the adjacent one end face of the precast column and allowing the grout to set.

10. The method defined in claim 8 which includes the steps of providing a second elongated connector means having cylindrical terminal end portions with a pair of collar means interengaged therewith intermediate the opposed terminal ends thereof;

inserting one terminal end of said second connector means into the cylindrical bore defined by the core of the column adjacent the other end face thereof so that one collar means of said pair engages the adjacent end face of said core, and the other collar means of said pair and the other terminal end of said second connector means are disposed freely above said other end face of said column; and disposing a second precast concrete column having an axially extending tubular core defining a cylindrical bore opening adjacent the opposed end faces of said second precast concrete column over said other terminal end of said second connector means so that said other terminal end of said second connector means is slidably received within the axial bore at one end of said second column and the adjacent end face of the core of said second column engages the other collar means of said pair whereby said second column is supported at said predetermined location in a predetermined position.

11. The method defined in claim 10 wherein the second connector means is exteriorly threaded for at least a portion of its length intermediate its opposed terminal ends and at least one collar means of the pair is threadingly interengaged therewith so as to be movable longitudinally of said second connector means and which includes the step of threading at least said one collar means of said pair along said second connector means to adjust the vertical spacing between the columns.

12. The method defined in claim 10 which includes the steps of introducing a grout material into the space adjacent the second connector means between the opposed ends of the columns and allowing said grout material to set.

13. A method for erecting a precast concrete structural frame having a plurality of columns spanned by at least one beam at a building site comprising the steps of:

providing a plurality of precast concrete columns having integral axially extending cores defining within each of said columns a cylindrical bore opening adjacent the opposed end faces of each column;

providing a corresponding plurality of elongated connector means, each of said connector means having an exteriorly threaded cylindrical portion at at least one end which is adapted to be slidably received within the bore of one of said columns;

erecting said plurality of elongated connector means by rigidly fixing the other end portion of each connector means in a suitable footing at predetermined spaced locations at said building site so that said exteriorly threaded cylindrical portion of each connector means extends freely above said footing in a predetermined position;

threadingly interengaging an interiorly threaded collar means with the exteriorly threaded free end portion of each of said erected connector means so that each of said collar means is disposed intermediate the terminus of the free end of the connector means with which it is associated and its respective footing;

disposing one of said precast concrete columns over the free end portion of each of said erected connector means so that the free end portion thereof which extends freely beyond the collar means associated therewith is slidably received within the bore adjacent one end of the column disposed thereover and the adjacent end of the core of said column engages said therewith associated collar means whereby each of said so disposed columns will be operatively erected so as to be positioned and supported at said predetermined spaced locations with their other ends extending freely above said footing;

providing at least one precast concrete beam having a plurality of longitudinally spaced transversely extending bores, corresponding in number and longitudinal spacing to the number and spacing of the columns to be spanned thereby, but of a transverse extent greater than that of said bores in said columns; and disposing said precast concrete beam over said other freely extending ends of a plurality of said erected columns so as to span the same and be supported thereby with each of said transversely extending beam bores in axial alignment with the bore of a subjacent erected column.

14. The method defined in claim 13 which includes the steps of introducing a settable grout material adjacent each connector means and into the space intermediate the footing and the one end of the columns associated therewith and allowing said grout material to set.

15. The method defined in claim 13 which includes the steps of:

providing a plurality of elongated column splicing means, each of said column splicing means having opposed cylindrical end portions and a pair of collar means interengaged therewith intermediate the opposed terminal ends thereof, each collar means of each of said pair having a maximum transverse extent greater than the transverse extent of the bores in the columns and less than the transverse extent of the bores in the beam;

inserting one terminal end of a said column splicing means through each transverse bore in the precast concrete beam and into the bore of the column subjacent thereto so that one collar means of each of said pair respectively engages the core of the associated subjacent column whereby the other collar means of each of said pair and the other terminal end of each of said so inserted column splicing means will be supported thereby and extend freely above said beam;

providing another plurality of precast concrete columns having integral axially extending cores defining within each of said other columns a cylindrical bore opening adjacent the opposed end faces of each of said other columns;

disposing one of said other precast concrete columns over the terminal free end portion of each of said column splicing means so that said terminal free end portions thereof are slidably received within said bores adjacent one end of said so disposed other columns respectively, and said other collar means of each of said pair engages the respectively associated cores thereof whereby each of said so disposed other columns will be operatively erected so as to be positioned and supported at said predetermined spaced locations with their other ends extending freely above said beam.

16. The method defined in claim 13 which includes the steps of interposing compressible gasket means between the precast concrete beam and the opposed adjacent other ends of the precast concrete columns to define thereat bearing pad receiving spaces in communication with the respectively associated transverse bores in said beam and introducing a bearing pad forming material into each of said bearing pad receiving spaces.

17. The method defined in claim 16 wherein the pad forming material comprises a flowable resin mixture which is poured into the pad receiving spaces through the respectively associated beam bores communicating therewith.

18. The method defined in claim 15 which includes the steps of introducing a settable grout material adjacent each connector means and into the space intermediate the footing and the neo end of the columns associated therewith and allowing said grout material to set.

19. The method defined in claim 18 which includes the steps of: interposing compressible gasket means between the precast concrete beam and the opposed other ends of the columns subjacent thereto to define thereat bearing pad receiving spaces in communication with the respectively associated transverse bores in said beam and introducing bearing pad forming material through said bores in said beam into each of said bearing pad receiving spaces.

20. The method defined in claim 19 wherein the bearing pad forming material comprises a flowable, settable resin mixture which is poured into the pad receiving spaces through the respectively associated transverse bores in said beam communicating therewith and which includes the steps of allowing said bearing pad forming material to set; introducing a settable grout material into each of said transverse bores over said bearing pad forming material and about the column splicing means extending within said transverse bores and allowing said grout material to set.

21. A method for splicing a previously erected precast concrete column having an integral axially extending core defining a cylindrical bore opening at least at the free end thereof to a second precast concrete column having an integral axially extending core defining a cylindrical bore opening at least at one end of said second column comprising the steps of:
   providing an elongated connector means having opposed cylindrical end portions adapted to be slidably received respectively within the bores of said first and second columns and a pair of radially extending collar means interengaged therewith intermediate the opposed terminal ends thereof;
   inserting one terminal end of said elongated connector means into the cylindrical bore at the free end of said first column so that the cylindrical end portion thereof is slidably received within said bore of said first column and one collar means of said pair engages the core of said first column; and
   disposing said one end of said second column over the other terminal end of said elongated connector means so that the cylindrical end portion thereof is slidably received within said bore of said second column and the other collar means of said pair engages the core of said second column to thereby support the same in predetermined spaced relation relative to said first column.

22. A structural frame erected at a building site comprising:
   a column having an axially extending bore defined by a hollow metal core means opening at at least one end thereof;
   an elongated connector means erected at said building site and slidably received in said bore at said one end of said column; and
   a radially outwardly extending enlargement carried by said connector means intermediate the opposed ends thereof engaging said hollow metal core means at said one end of said column so as to support said column in an erect position at the desired elevation.

23. The structure defined in claim 22 wherein the enlargement is carried by the connector means by means of interengaged threads.

24. The structure defined in claim 22 wherein a grout material abuts the one end of the column and the exteriorly adjacent portion of the connector means.

25. A structural frame erected at a building site comprising in combination:
   a structural column having a cylindrical bore opening at least at the lower end thereof;
   an elongated connector means having one terminal end portion slidably received within said cylindrical bore of said column, the other terminal end portion embedded in a suitable footing means at a predetermined location at said building site and an exteriorly threaded cylindrical portion intermediate said terminal end portions; and
   an interiorly threaded collar means threadingly interengaged with said threads carried by said connector means engaging the lower end of said column to thereby operatively support the same.

26. The structure defined in claim 25 wherein a settable grout material is interposed between the footing means and the lower end of the column.

27. The structure defined in claim 25 wherein the column comprises a precast concrete column and the bore thereof is defined by an axially extending hollow metal core bonded to the concrete of the column so as to be integral therewith.

28. A structural frame erected at a building site comprising in combination:
   a plurality of precast concrete columns having integral axially extending cores defining within each of said columns a hollow cylindrical bore opening adjacent the opposed end faces of each of said columns;
   elongated connector means having one terminal end portion slidably received within the bores of each of said columns adjacent one end face thereof, the other terminal end portion rigidly fixed in a suitable footing at predetermined space locations at said building site and an exteriorly threaded cylindrical portion intermediate said opposed terminal end portions thereof;
   interiorly threaded collar means threadingly interengaged with said exteriorly threaded portions of each of said connector means engaging the core of the column respectively associated therewith; and
   at least one precast concrete beam spanning a plurality of said columns, said beam having a plurality of longitudinally spaced transversely extending bores of a transverse extent greater than the corresponding transverse extent of the bores in said columns axially aligned respectively with the bores in the subjacent columns spanned thereby.

29. The structure defined in claim 28 wherein the transversely extending bores in the beam are each defined by hollow tubular steel sleeves embedded in the concrete of said beam; the cores in the columns comprise tubular members, the connector means comprise tubular steel elements and the collar means comprise ring-like steel elements.

30. The structure defined in claim 28 wherein a compressible gasket means is interposed between the precast concrete beam and the end faces of the columns respectively subjacent thereto so as to define thereat bearing pad receiving spaces wherein there is disposed a relatively rigid bearing pad material.

31. The structure defined in claim 30 wherein the bearing pad material comprises a mixture of an epoxy resin and sand and the compressible gasket means comprises neoprene rubber.

32. The structure defined in claim 28 wherein the spaces intermediate the footing and the adjacent one end faces of the columns are filled with a settable grout material.

33. The structure defined in claim 28 wherein the columns include steel reinforcing elements embedded therein.

34. The structure defined in claim 28 wherein the footing comprises a concrete foundation bonded to a metal insert surrounding the other terminal end portion of the connector means and a suitable grout material interposed between said insert and said other terminal end of said connector means and bonded thereto.

35. The structure defined in claim 28 which includes:
   elongated column splicing means extending through each of the transversely extending bores in the beam and having one terminal end portion slidably received within the bores adjacent the other end of the respectively subjacent columns, the other terminal end portion thereof extending freely above said beam and an exteriorly threaded cylindrical portion intermediate said opposed terminal end portions; and
   a pair of interiorly threaded collar means theadingly interengaged with said exteriorly threaded portion of each of said column splicing means, one collar means of each of said pair engaging the core of the subjacent column with which it is associated and the other collar means of each of said pair being disposed above said beam adjacent the other terminal end portion of said column splicing means.

36. The structure defined in claim 35 wherein the other terminal end portion of each of said column splicing means is slidably received within the bore of a precast concrete column having an integral axially extending core defining a hollow cylindrical bore opening adjacent the opposed end faces thereof, and the other collar means of each of said pair associated therewith engages the core of said last mentioned column.

37. The structure defined in claim 36 wherein the transversely extending bores in the beam and the space intermediate the beam and the last-mentioned columns are filled with a grout material.

38. A means for connecting a column having an axially extending hollow cylindrical bore to another member comprising in combination an elongated hollow spindle terminating in at least one exteriorly threaded cylindrical end portion which is adapted to be slidably received within the bore of said column and an interiorly threaded collar having an external diameter greater than the internal diameter of the bore in said column, threadingly interengaged with said exteriorly threaded portion of said spindle and adapted to supportingly engage one end of the core of said column when said one end portion of said spindle is received within the bore of said column.

39. A method of erecting at a building site a precast concrete column having an axially extending tubular core defining a cylindrical bore opening adjacent the opposed end faces of said column comprising the steps of:
　providing an excavation at the desired location at said building site;
　disposing a hollow metal insert at the desired location within said excavation;
　filling the space between the exterior of said insert and said excavation with a settable concrete material so as to fix said insert to said building site;
　positioning an elongated connector spindle means within the cavity defined by the interior of said hollow metal insert so that one end of said connector spindle extends vertically outwardly of said cavity in axial alignment with the longitudinal center line of the column to be erected;
　supporting and retaining said connector spindle in said aforementioned position within said cavity and simultaneously therewith filling said cavity with a settable grout material;
　maintaining said connector spindle in said aforementioned position while allowing the grout to set whereby said connector spindle will be rigidly fixed in said aforementioned position;
　interengaging a collar means with said connector spindle intermediate the said one end thereof and the grout within which said connector spindle is embedded; and
　disposing said column over said connector spindle so that said one end thereof is slidably received within said bore of said column and said collar means supportingly engages the adjacent end of said core of said column.

40. The method defined in claim 39 wherein the connector spindle is hollow which includes the steps of inserting rod means through the bore in the column and through said connector means and tensioning said rod means to apply axial compression to said column.

41. A method of forming a bearing pad between a concrete beam and the opposed subjacent end face of a concrete column comprising the steps of: interposing a compressible gasket means between said beam and the periphery of said opposed end face of said column so as to define between said beam and said end face of said column an enclosed bearing pad receiving space, introducing a flowable, curable resin mixture into said bearing pad receiving space and venting said bearing pad receiving space to the surrounding atmosphere so that said resin material completely fills said bearing pad receiving space and curing said resin material to thereby form said bearing pad in intimate contact with the opposed surfaces of said beam and said column.

42. A gasket for enclosing a bearing pad receiving space between a concrete beam and the opposed subjacent end face of a concrete column comprising a ring-like gasket formed of a compressible resilient material conforming generally in shape to the periphery of said end face of said column and conduit means carried by said gasket providing fluid communication between the interior and exterior surfaces of said gasket.

43. A precast concrete column for use in erecting structural frames wherein column base connections and column to column connections are effected by an elongated connector means having at least one radially outwardly extending collar means disposed intermediate the terminal ends thereof, said precast concrete column comprising: an elongated body of precast concrete having embedded therewithin and bonded thereto a transversely centered axially extending tubular steel core defining a hollow bore opening at the opposed end faces of said column, said core being adapted to engage said collar means and said bore being adapted to slidably receive a terminal end portion of said connector means.

44. A precast concrete beam adapted to continuously span a plurality of precast concrete columns having axially extending bores adapted to be connected to a plurality of superposed similar precast concrete columns by means of elongated connector means to form a structural frame of the type described, said precast concrete beam comprising an elongated body of precast concrete having a plurality of tranversely extending longitudinally spaced tubular steel sleeves embedded therewithin defining hollow bores extending transversely of the said beam and opening at a pair of opposed side faces thereof, the number and longitudinal spacing of said sleeves corresponding to the number and spacing of the columns to be spanned by said beam and the bores defined thereby being of a greater transverse extent than the corresponding transverse extent of the bores in the columns to be spanned thereby so that when said beam operatively spans said columns, each of the bores in said beam will be axially aligned with the bore of a spanned column and adapted to operatively receive the elongated connector means respectively associated therewith.

45. A multiple tier structural frame erected at a building site comprising in combination:
　a plurality of precast concrete first and second tier columns having integral axially extending tubular steel cores defining within each of said columns a hollow cylindrical bore opening adjacent the opposed upper and lower end faces thereof;
　elongated connector means associated with each of said first tier columns, each of said connector means having one terminal end portion fixed in a suitable footing at predetermined spaced locations at said building site and the other terminal end portion slidably disposed within the bore adjacent the lower end face of the first tier column associated therewith;
　a radially extending collar means carried by each of said elongated connector means intermediate the opposed ends thereof engaging the tubular steel core of the first tier column respectively associated therewith and supporting said first tier column at the desired elevation in an erect position;
　at least one precast concrete beam spanning and supported by a plurality of said first tier columns, said beam having a plurality of transversely extending longitudinally spaced tubular steel sleeves embedded therewithin defining hollow bores, each of said bores extending transversely of said beam and opening at the opposed upper and lower side faces of said beam in axial alignment with the bore of a first tier column spanned by said beam;

elongated cylindrical column splicing means extending axially through each of the bores in said beam, each of said elongated column splicing means having one terminal end portion slidably disposed within the upper end of the bore of a first tier column spanned by said beam and the other terminal end portion extending above said beam and slidably disposed within the lower end of the bore of a second tier column extending upwardly above said beam; and a pair of radially outwardly extending collar means carried by each of said elongated column splicing means, one collar means of each of said pair engaging the upper end of the tubular steel core of the subjacent first tier column with which it is associated and the other collar means of each of said pair being disposed above said beam and supportingly engaging the lower end of the tubular steel core of the overlying second tier column with which it is associated.

References Cited

UNITED STATES PATENTS

| | | | |
|---|---|---|---|
| Re. 23,074 | 1/1949 | Henderson | 52—585 |
| 1,567,301 | 12/1925 | Ross | 52—585 |
| 1,596,039 | 8/1926 | Whittaker | 52—365 |
| 2,795,130 | 6/1957 | Pritchett | 52—365 |
| 3,216,157 | 11/1965 | Pinter | 52—263 |
| 3,260,025 | 7/1966 | Van Der Lely | 52—236 |
| 2,948,995 | 8/1960 | Cogan | 52—259 |
| 3,110,982 | 11/1963 | Besinger | 52—301 |

FOREIGN PATENTS

| | | |
|---|---|---|
| 209,539 | 6/1960 | Austria. |
| 296,773 | 5/1965 | Netherlands. |
| 313,326 | 5/1956 | Switzerland. |

JAMES T. McCALL, *Primary Examiner.*

RAYMOND D. KRAUS, *Assistant Examiner.*

U.S. Cl. X.R.

52—236, 263, 295, 301